(No Model.)

J. W. KENADY.
CAR BRAKE.

No. 258,434. Patented May 23, 1882.

WITNESSES
W. H. N. Knight
Harry Bernhard

INVENTOR
John W. Kenady
By Edson Bro's
Attorneys

UNITED STATES PATENT OFFICE.

JOHN W. KENADY, OF GARFIELD, LOUISIANA.

CAR-BRAKE.

SPECIFICATION forming part of Letters Patent No. 258,434, dated May 23, 1882.

Application filed March 22, 1882. (No model.)

*To all whom it may concern:*

Be it known that I, JOHN W. KENADY, a citizen of the United States, residing at Garfield, Caddo parish, and State of Louisiana, have invented certain new and useful Improvements in Car-Brakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1:
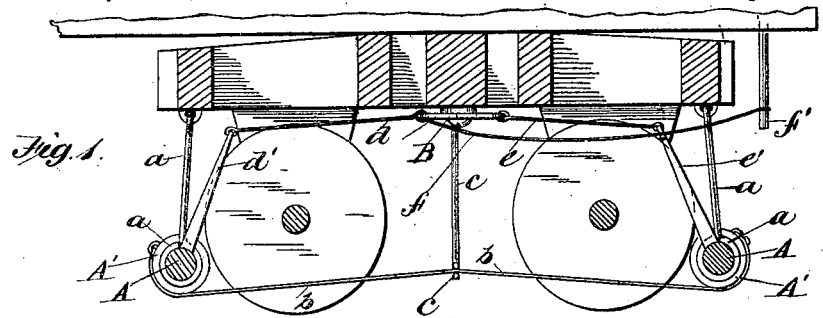
Figure 2:
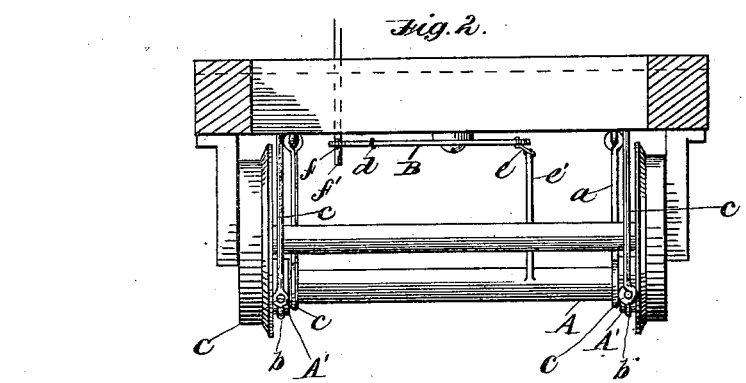
Figure 3:
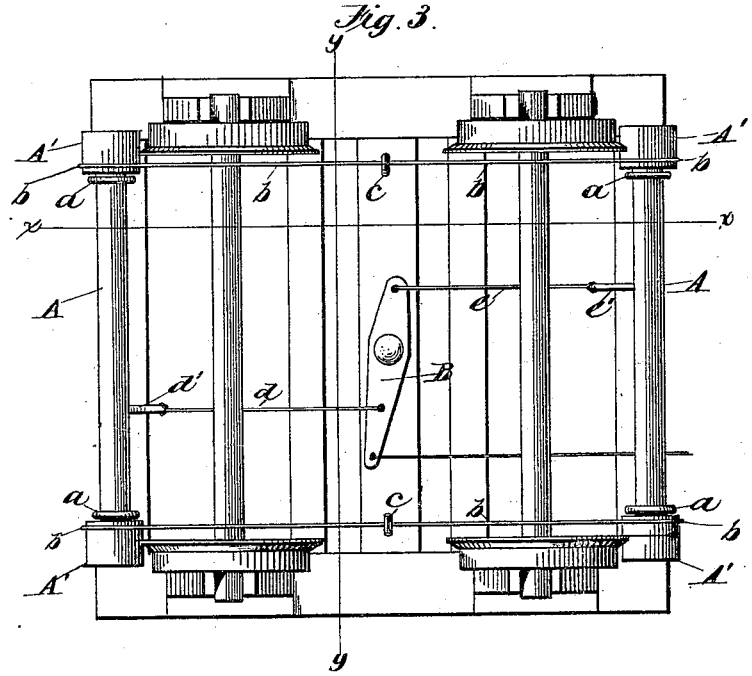

Figure 1 is a longitudinal section of my carbrake. Fig. 2 is a transverse section, and Fig. 3 is an inverted view, thereof.

This invention has relation to an improvement in car-brakes, having for its object to readily and effectively apply and take off the brakes; and it consists of shafts having cylindrical brakes capable of partial rotary movement and of movement toward and from the wheels, combined with means, substantially as hereinafter more fully set forth and claimed, to effect these ends.

To carry into effect my invention I employ, as will be observed by reference to the accompanying drawings, the shafts A A, having the cylindrical brakes A', and hung in hangers or bearings $a$ hinged or pivoted to the under side of the car, the purpose of which is to permit the movement toward and from the wheels and the partial rotary movement of the brakes. The brakes of the two shafts of a car are connected together by cords or chains $b$, each cord or chain passing about midway its length through an eye or looped bolt, $c$, secured to the under side of the car, and having its eye or loop arranged slightly above the lower surfaces of the brakes. When the brakes are to be applied their partial rotary movement will draw upon the cords or chains and pull upon the brakes, thus holding them upon the wheels.

B is a lever pivoted to a cross-piece of the truck, near one end, and connected by cord or chain $d$, a short distance from the end of its pivoted portion, to an arm or lever, $d'$, extending upwardly from one brake-shaft A. The extreme end of the pivoted portion of the lever B is connected by a chain or cord, $e$, to a similar arm or lever, $e'$, similarly extending from the other brake-shaft A. The opposite end or handle of the lever B is connected by a cord or chain, $f$, to the brake-wheel shaft $f'$, passing through the car-platform. It will be observed that by turning the brake-wheel in the required direction the lever B will be operated and draw upon and partially rotate the brake-shafts and the brakes, which will draw upon the cords or chains $b$, and thus cause them to pull and hold the brakes upon the wheels until desired to be released.

It is obvious that one of the chains or cords $b$ can be dispensed with without departing from the principle or sacrificing the advantages of my invention.

Having thus fully described my invention, I claim and desire to secure by Letters Patent—

In a car-brake, the suspended brake-shafts having brakes capable of a partial rotary movement and movement toward and from the wheels, combined with the chains or cords fastened to said brakes and passed through eye or looped bolts depending from the car and having their lower ends arranged slightly above the lower surfaces of the brakes, and mechanism to rotate the brake-shafts in their bearings, substantially as and for the purpose set forth.

In testimony whereof I affix my signature in presence of two witnesses.

JOHN W. KENADY.

Witnesses:
C. R. GARWIN,
F. O. SPEARMAN.